United States Patent
Hinata et al.

(10) Patent No.: US 12,204,151 B2
(45) Date of Patent: Jan. 21, 2025

(54) FERRULE, OPTICAL CONNECTOR, AND OPTICAL CONNECTOR MODULE HAVING A SLIDING MEMBER PRESSING AN OPTICAL TRANSMISSION MEMBER SUCH AS OPTICAL FIBERS AND/OR WAVEGUIDES

(71) Applicant: Enplas Corporation, Saitama (JP)

(72) Inventors: Ayano Hinata, Saitama (JP); Yuto Kujirai, Saitama (JP)

(73) Assignee: Enplas Corporation, Saitama (JP)

( * ) Notice: Subject to any disclaimer, the term of this patent is extended or adjusted under 35 U.S.C. 154(b) by 163 days.

(21) Appl. No.: 18/111,612

(22) Filed: Feb. 20, 2023

(65) Prior Publication Data
US 2023/0266540 A1    Aug. 24, 2023

(30) Foreign Application Priority Data
Feb. 21, 2022    (JP) .................................. 2022-025074

(51) Int. Cl.
*G02B 6/38*    (2006.01)
(52) U.S. Cl.
CPC .................................. *G02B 6/3838* (2013.01)
(58) Field of Classification Search
CPC .. G02B 6/3838; G02B 6/3861; G02B 6/3839; G02B 6/3885
See application file for complete search history.

(56) References Cited

U.S. PATENT DOCUMENTS

| | | | | |
|---|---|---|---|---|
| 6,108,904 A | * | 8/2000 | Brekosky | H01R 12/772 29/749 |
| 6,256,448 B1 | * | 7/2001 | Shahid | G02B 6/3885 385/83 |
| 6,364,539 B1 | * | 4/2002 | Shahid | G02B 6/3885 385/83 |
| 6,434,316 B1 | * | 8/2002 | Grois | G02B 6/3879 385/139 |
| 7,578,623 B2 | * | 8/2009 | Wang | G02B 6/423 385/88 |
| 9,563,030 B2 | * | 2/2017 | Barwicz | G02B 6/4292 |
| 9,739,953 B2 | * | 8/2017 | Moriyama | G02B 6/4284 |
| 9,857,539 B2 | * | 1/2018 | Barwicz | G02B 6/4292 |
| 10,416,393 B2 | * | 9/2019 | Barwicz | G02B 6/30 |
| 11,726,268 B1 | * | 8/2023 | Sukegawa | G02B 6/3885 385/83 |
| 12,032,213 B1 | * | 7/2024 | Saito | G02B 6/4292 |
| 2001/0046804 A1 | * | 11/2001 | Fuchs | H01R 12/88 439/495 |
| 2013/0195470 A1 | * | 8/2013 | Yasuda | G02B 6/4214 29/592.1 |

(Continued)

*Primary Examiner* — Andrew Jordan

(57) ABSTRACT

A ferrule includes a holding part, a first surface, and a second surface. The holding part includes a holding recess, a first groove disposed at the holding recess along an extending direction of the optical transmission member, the first groove being a groove where the optical transmission member is disposed, a pressing member configured to press the optical transmission member toward the first groove, and a sliding part disposed at the holding recess and the pressing member, and configured to slide the pressing member with respect to the holding recess along the extending direction of the optical transmission member.

10 Claims, 13 Drawing Sheets

(56) References Cited

U.S. PATENT DOCUMENTS

| | | | | |
|---|---|---|---|---|
| 2016/0091675 A1* | 3/2016 | Barwicz | ............... | G02B 6/3885 |
| | | | | 385/77 |
| 2016/0356962 A1* | 12/2016 | Moriyama | ............. | G02B 6/387 |
| 2017/0097474 A1* | 4/2017 | Barwicz | ............... | G02B 6/3885 |
| 2018/0039029 A1* | 2/2018 | Barwicz | ............... | G02B 6/4292 |
| 2018/0067262 A1* | 3/2018 | Larson | ................... | G02B 6/255 |
| 2019/0079253 A1 | 3/2019 | Koumans | | |
| 2023/0266540 A1* | 8/2023 | Hinata | ................. | G02B 6/3839 |
| | | | | 385/78 |
| 2023/0296849 A1* | 9/2023 | Nakamura | ........... | G02B 6/3885 |
| | | | | 385/78 |
| 2023/0305237 A1* | 9/2023 | Hinata | ................. | G02B 6/3834 |
| 2023/0314726 A1* | 10/2023 | Kon | .................... | G02B 6/3885 |
| | | | | 385/78 |
| 2023/0341634 A1* | 10/2023 | Fujihara | ............... | G02B 6/3839 |
| 2024/0012205 A1* | 1/2024 | Hinata | ................. | G02B 6/3843 |
| 2024/0053546 A1* | 2/2024 | Hinata | ................. | G02B 6/3885 |
| 2024/0103233 A1* | 3/2024 | Hinata | ..................... | G02B 6/32 |
| 2024/0201449 A1* | 6/2024 | Saito | .................... | G02B 6/3847 |

\* cited by examiner

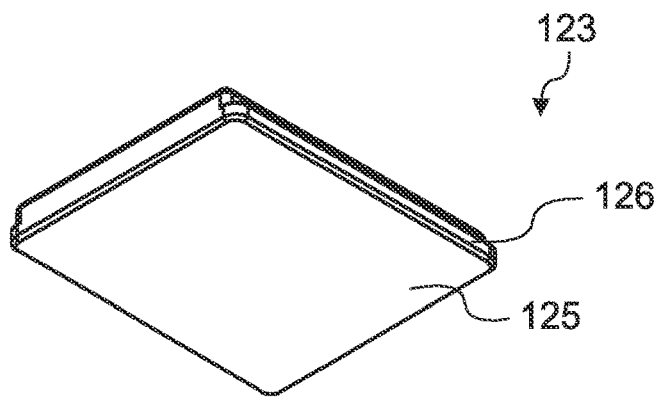
FIG. 8A
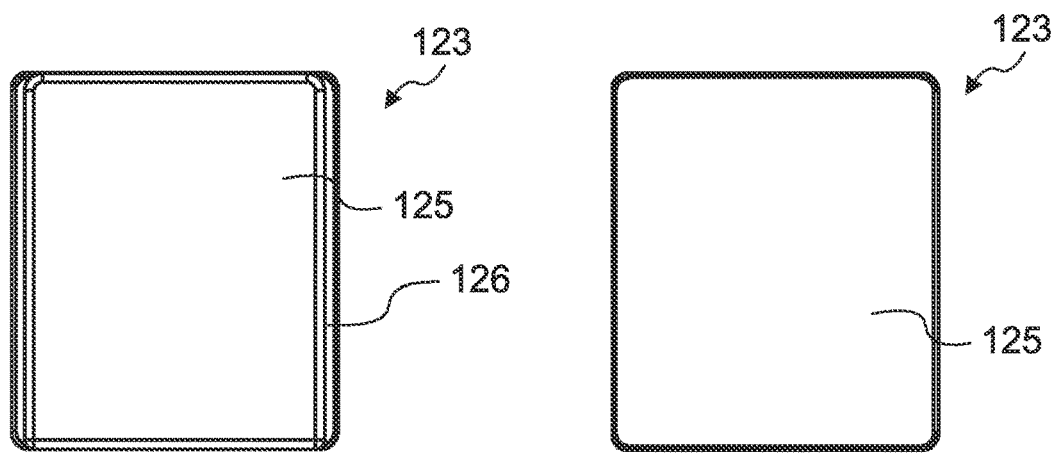
FIG. 8B
FIG. 8C
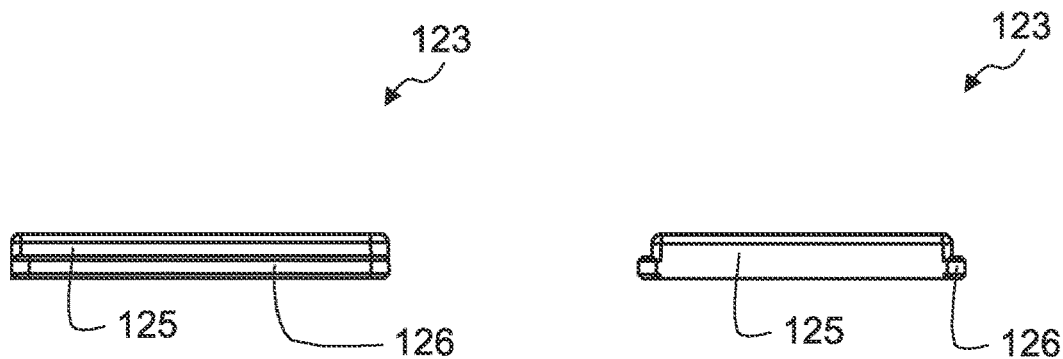
FIG. 8D
FIG. 8E

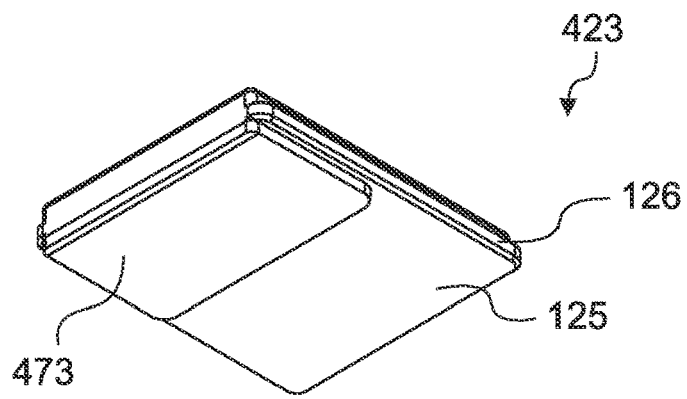
FIG. 11A
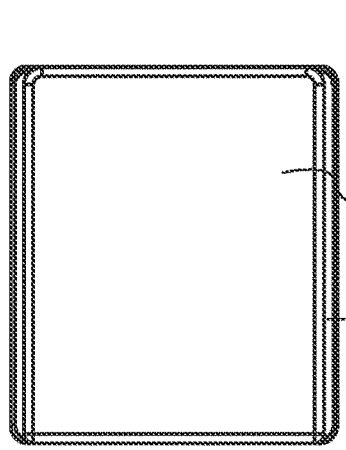 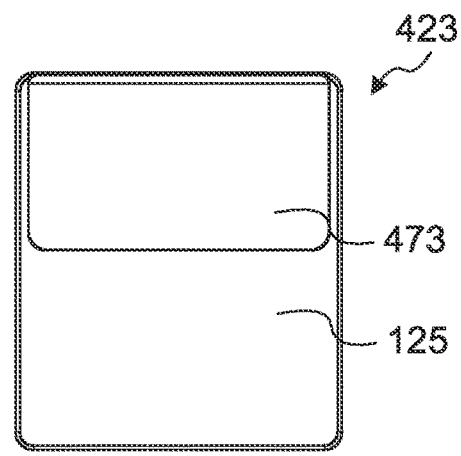
FIG. 11B  FIG. 11C
 
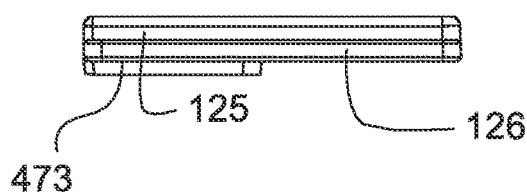 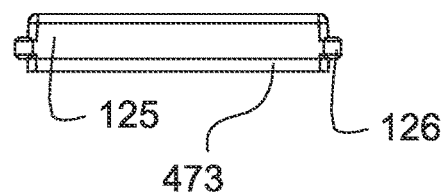
FIG. 11D  FIG. 11E

FERRULE, OPTICAL CONNECTOR, AND OPTICAL CONNECTOR MODULE HAVING A SLIDING MEMBER PRESSING AN OPTICAL TRANSMISSION MEMBER SUCH AS OPTICAL FIBERS AND/OR WAVEGUIDES

This application claims the benefit of priority of Japanese Patent Application No. 2022-025074, filed on Feb. 21, 2022, the contents of which are incorporated by reference as if fully set forth herein in their entirety.

TECHNICAL FIELD

The present invention relates to a ferrule for holding an optical transmission member, an optical connector and an optical connector module.

BACKGROUND ART

In the related art, optical transmission members such as optical fibers and optical waveguides are used for optical communications. In the state where the end is held by a ferrule, the optical transmission member is optically connected with other optical components or other optical transmission members (see, for example, PTL 1).

PTL 1 discloses a base (ferrule) including a light coupling part having a plurality of optical surfaces and serving as a light path between a coupling element and an optical fiber, a fiber holding part, and a fiber supporting part. The fiber holding part includes a V-groove and a fiber holding cover, and holds one end portion of the optical fiber. The fiber supporting part includes a recess and a cover, and supports the optical fiber so as to prevent bending of the optical fiber.

The base disclosed in PTL 1 fixes the optical fiber by pressing the optical fiber to the V-groove from the upper side with the fiber holding cover, and then pressing the optical fiber to the recess from the upper side with the cover.

CITATION LIST

Patent Literature

PTL 1
US Patent Application Publication No. 2019/0079253

SUMMARY OF INVENTION

Technical Problem

However, the base (ferrule) disclosed in PTL 1 sets the position of the optical fiber by pressing the optical fiber to the V-groove from the upper side with the fiber holding cover, and as such may not accurately set the position of the end of the optical fiber. In addition, since it is necessary to fix the optical fiber with the fiber holding cover and the cover, the assembling operation efficiency is low.

An object of the present invention is to provide a ferrule that can accurately set the position of the end of the optical transmission member, and is easy to assemble. In addition, another object of the present invention is to provide an optical connector and an optical connector module including the ferrule.

Solution to Problem

A ferrule of an embodiment of the present invention is configured to hold an optical transmission member, the ferrule includes: a holding part configured to hold one end portion of the optical transmission member; a first surface configured to allow light emitted from the optical transmission member held by the holding part to enter the ferrule; and a second surface configured to emit, to outside of the ferrule, light advanced inside of the ferrule. The holding part including: a holding recess, a first groove disposed at the holding recess along an extending direction of the optical transmission member, the first groove being a groove where the optical transmission member is disposed, a pressing member configured to press the optical transmission member toward the first groove, and a sliding part disposed at the holding recess and the pressing member, and configured to slide the pressing member with respect to the holding recess along the extending direction of the optical transmission member.

An optical connector of an embodiment of the present invention includes: the above-described ferrule, and an optical transmission member.

An optical connector module of an embodiment of the present invention includes the above-described optical connector.

Advantageous Effects of Invention

According to the present invention, a ferrule that can accurately set the position of the end of the optical transmission member and is easy to assemble can be provided.

BRIEF DESCRIPTION OF DRAWINGS

FIGS. 8A to 8E are diagrams illustrating a configuration of the lid;

FIGS. 11A to 11E are diagrams illustrating a configuration of a lid according to Modification 3;

DESCRIPTION OF EMBODIMENTS

An optical connector according to an embodiment of the present invention is described below with reference to the accompanying drawings.

Configuration of Optical Connector

Figure 1:
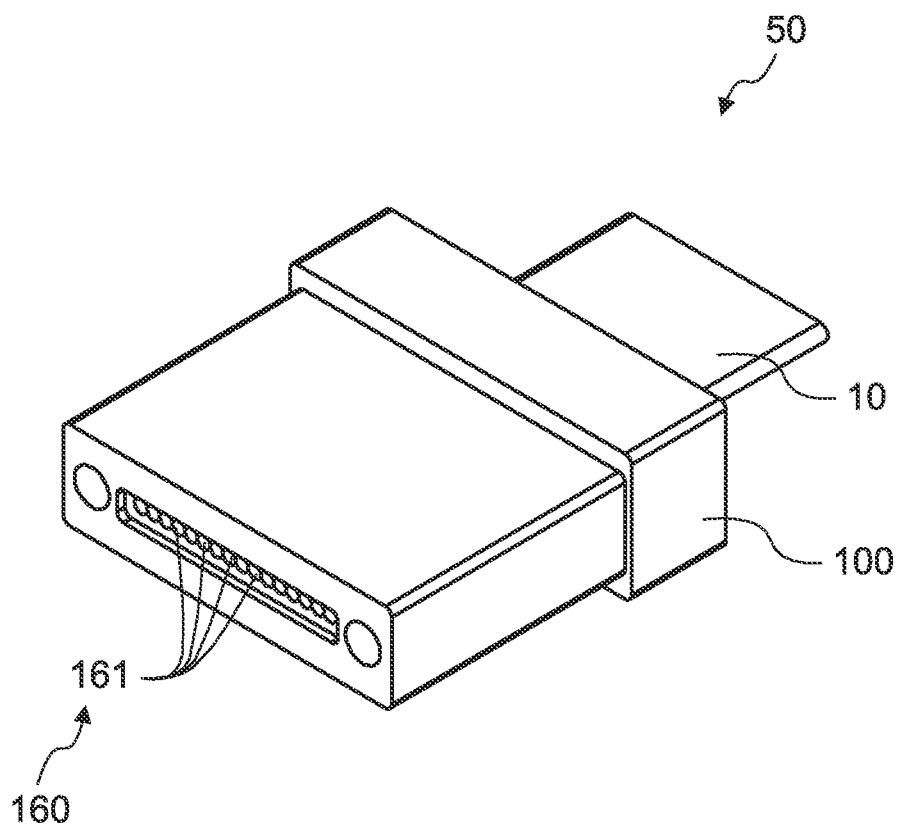
FIG. 1 is a perspective view of an optical connector according to an embodiment of the present invention as viewed from the lower side.
Figure 2A:
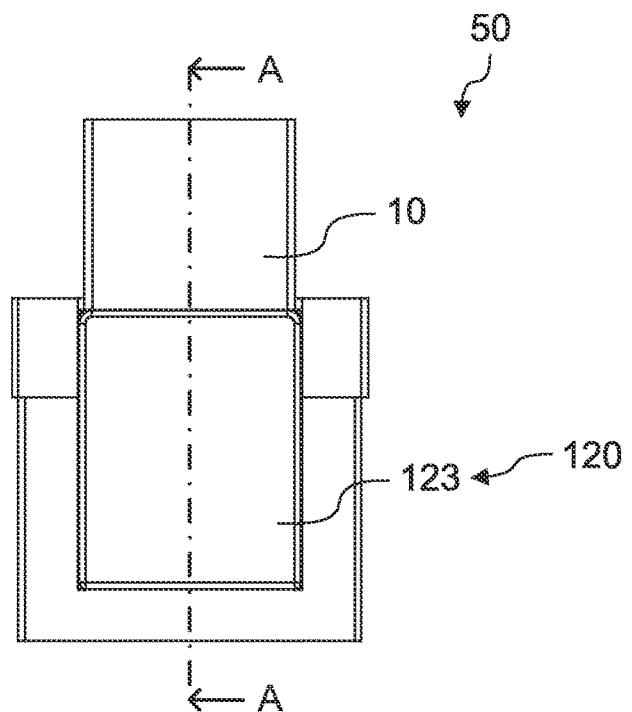
FIGS. 2A and 2B are diagrams illustrating a configuration of the optical connector.
Figure 2B:
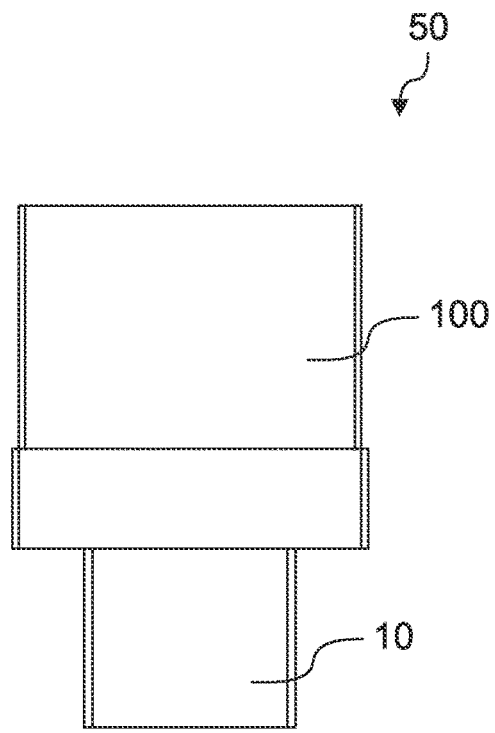
Figure 3A:
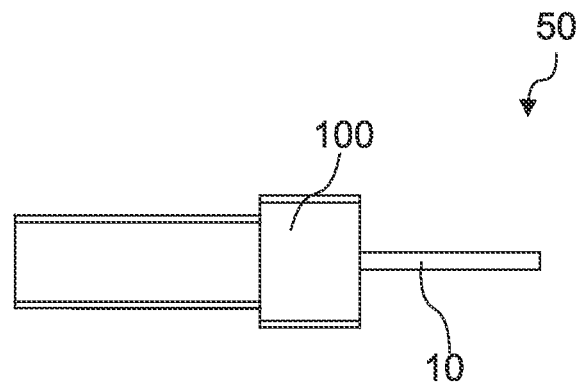
FIGS. 3A and 3B are diagrams illustrating a configuration of the optical connector.
Figure 3B:
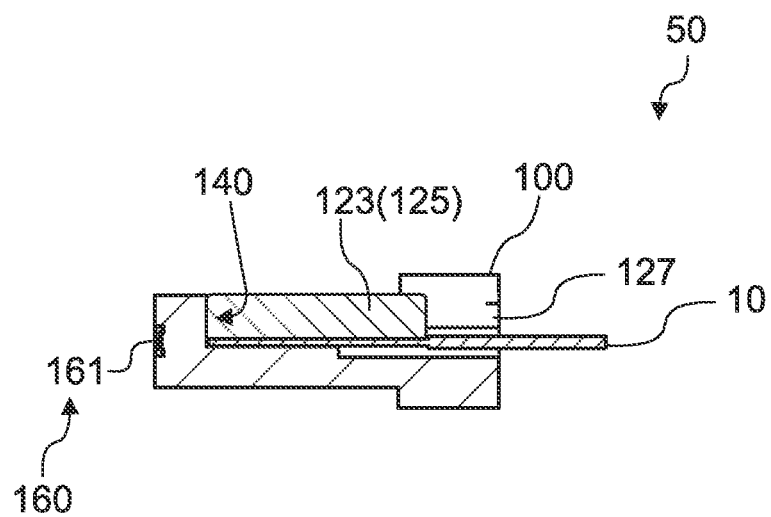
Figure 4A:
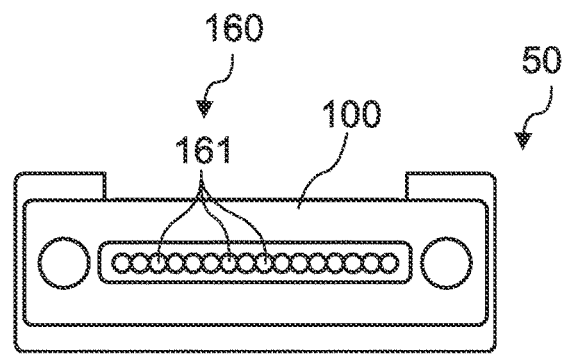
FIGS. 4A to 4C are diagrams illustrating a configuration of the optical connector.
Figure 4B:
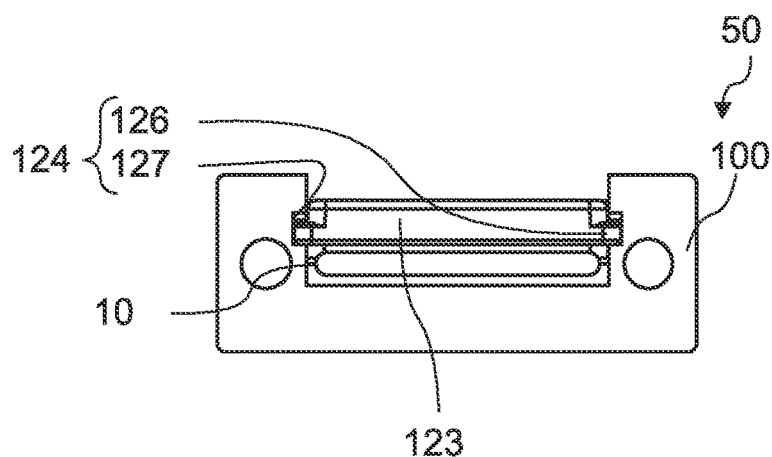
Figure 4C:
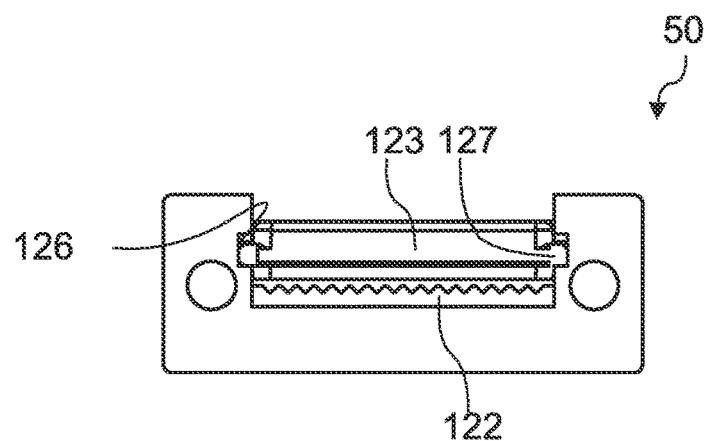

FIG. 1 is a perspective view of optical connector 50 as viewed from the lower side. FIG. 2A is a plan view of optical connector 50, and FIG. 2B is a bottom view. FIG. 3A is a right side view of optical connector 50, and FIG. 3B is a sectional view taken along line A-A of FIG. 2A. FIG. 4A is a front view of optical connector 50, and FIGS. 4B and 4C are rear views. Note that in FIG. 4C, optical transmission member 10 and pressing member 123 are omitted.

Note that in the following description, the direction in which optical transmission member 10 is disposed in parallel (the direction in which projecting surfaces 161 of second surface 160 are arranged) is "first direction" or "X direction", the direction orthogonal to the X direction in front view of second surface 160 is "second direction" or "Z direction", and the direction orthogonal to the X direction and the Z direction is "third direction" or "Y direction".

As illustrated in FIGS. 1 to 4C, optical connector 50 according to Embodiment 1 includes ferrule 100 and optical transmission member 10. Optical connector 50 according to the present embodiment may be used as an optical connector module together with a housing, a spring clamp structure part and the like.

The type of optical transmission member 10 is not limited. Examples of the type of optical transmission member 10 include optical fibers and optical waveguides. In the present embodiment, optical transmission member 10 is an optical fiber. In addition, the optical fiber may be of a single mode type, or of a multiple mode type. The end surface of optical transmission member 10 may be parallel to the plane orthogonal to the extending direction of optical transmission member 10, or may be tilted with respect to the plane orthogonal to the extending direction of optical transmission member 10. In the present embodiment, the end surface of optical transmission member 10 is tilted with respect to the plane orthogonal to the extending direction of optical transmission member 10. In the present embodiment, the inclination angle to the plane is 5 degrees, for example. The number of optical transmission members 10 is not limited. In the present embodiment, sixteen optical transmission members 10 are provided for one ferrule 100. The end portion of optical transmission member 10 is fixed to ferrule 100.

Figure 5A:
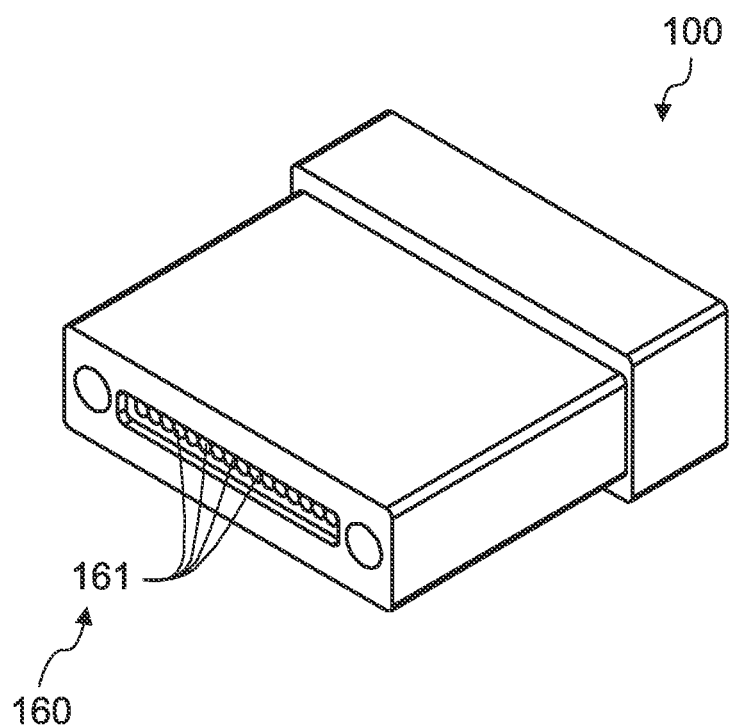
FIGS. 5A and 5B are diagrams illustrating a configuration of a ferrule from which a lid is detached.
Figure 5B:
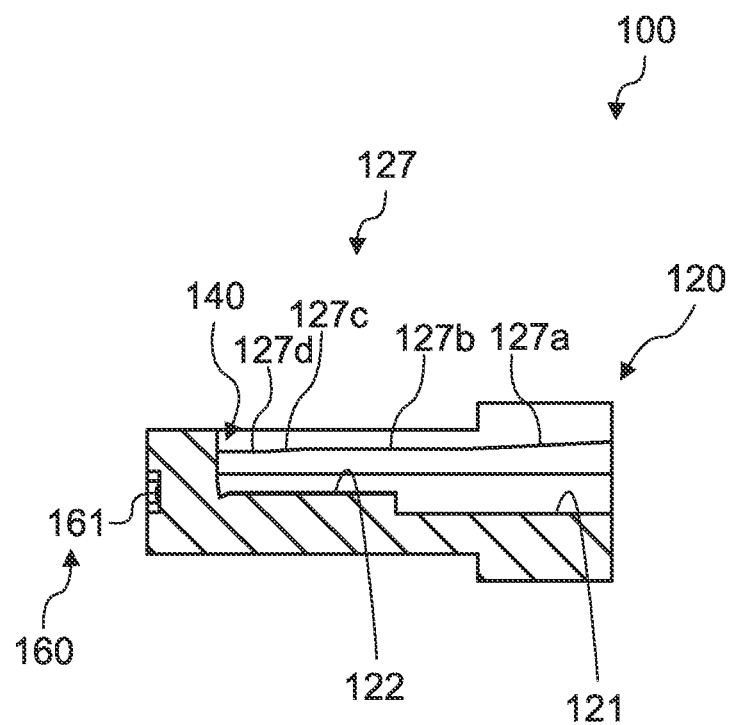
Figure 6A:
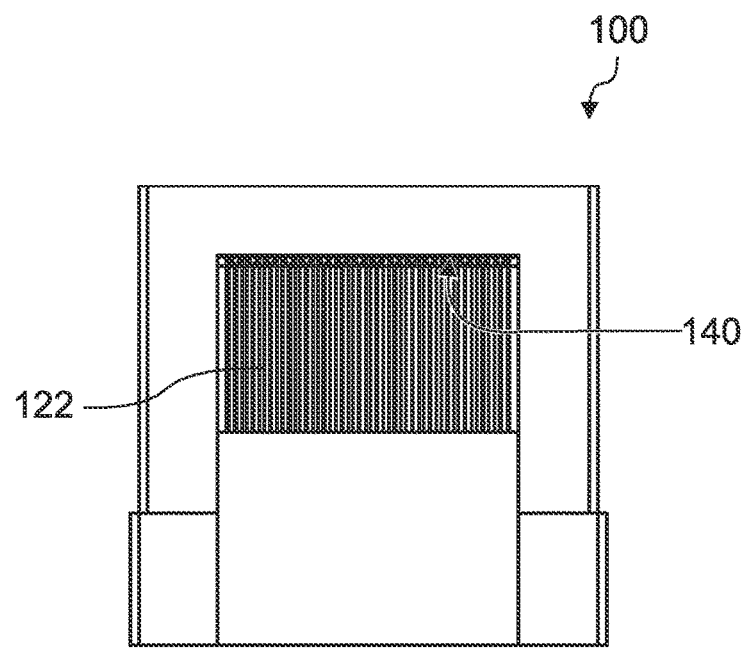
FIGS. 6A and 6B are diagrams illustrating a configuration of the ferrule from which the lid is detached.
Figure 6B:
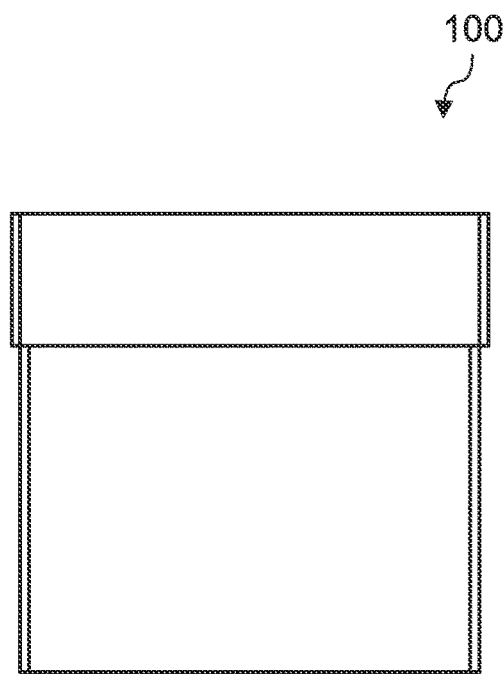
Figure 7A:
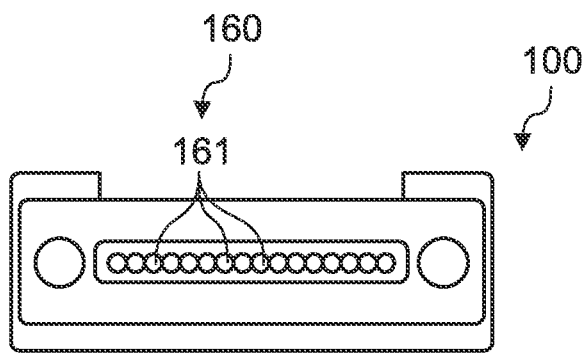
FIGS. 7A to 7C are diagrams illustrating a configuration of the ferrule from which the lid is detached.
Figure 7B:
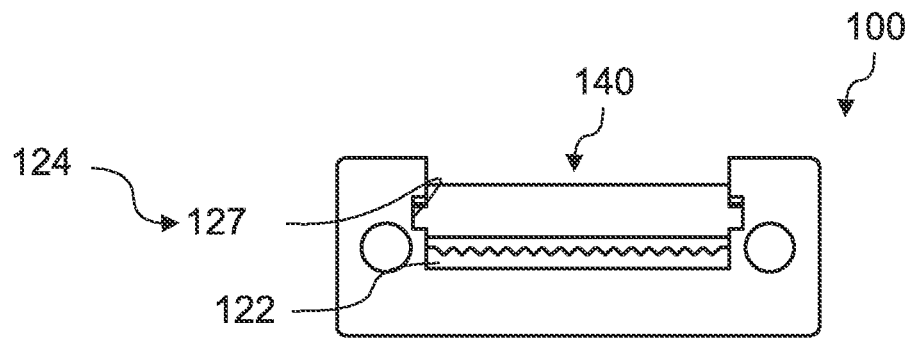
Figure 7C:

FIG. 5A is a perspective view of ferrule 100 from which pressing member 123 is detached as viewed from the lower side, and FIG. 5B is a sectional view. FIG. 6A is a plan view of ferrule 100 from which pressing member 123 is detached, and FIG. 6B is a bottom view. FIG. 7A is a front view of ferrule 100 from which pressing member 123 is detached, FIG. 7B is a rear view, and FIG. 7C is a right side view. FIG. 8A is a perspective view of pressing member 123 as viewed from the lower side, FIG. 8B is a plan view, FIG. 8C is a bottom view, FIG. 8D is a right side view, and FIG. 8E is a front view.

Ferrule 100 is a member with a substantially cuboid shape. Ferrule 100 includes holding part 120, first surface 140, and second surface 160. Ferrule 100 is formed using a material that is optically transparent to light with wavelengths used for optical communications. Examples of the material of ferrule 100 include polyetherimide (PEI) such as ULTEM (registered trademark) and transparent resins such as cyclic olefin resin. In addition, ferrule 100 is manufactured by injection molding.

Holding part 120 holds the end portion of optical transmission member 10. Holding part 120 includes holding recess 121, first groove 122, pressing member 123, and sliding part 124.

Holding recess 121 is a recess that opens at the top surface and back surface of ferrule 100. The planar shape of holding recess 121 is not limited as long as the end portions of a plurality of optical transmission members 10 can be disposed at appropriate positions. In the present embodiment, the planar shape of holding recess 121 is rectangular. In the present embodiment, sliding groove 127 of sliding part 124 for disposing pressing member 123 at a predetermined position is disposed at the both end portions of holding recess 121 in the first direction (the X direction). First groove 122 is disposed at the bottom surface of holding recess 121.

First groove 122 is a groove for setting the position of optical transmission member 10. First groove 122 may be disposed in the entirety of the bottom surface of holding recess 121, or in a part of the bottom surface of holding recess 121. In the present embodiment, first groove 122 is disposed in a part of the region on the first surface 140 side in the bottom surface of holding recess 121. The number of first grooves 122 need only be greater than the number of optical transmission members 10 installed. In the present embodiment, the number of first grooves 122 is the same as the number of optical transmission members 10 installed, i.e., 16. The cross-sectional shape of first groove 122 in the XZ cross-section is not limited. First groove 122 may be a V-shaped groove or a U-shaped groove. In the present embodiment, first groove 122 is a V-shaped groove. Here, "V-groove" is a groove composed of two planes, with a V-shape in the cross section perpendicular to the extending direction of the groove. The connecting part of the two planes may be chamfered (processed into a rounded corner). "U-groove" is a groove composed of one curved surface, with an arc-like shape in the cross section perpendicular to the extending direction of the groove. Preferably, the depth of first groove 122 is a depth with which the upper end portion of optical transmission member 10 is located on the upper side of the upper end portion of first groove 122 (the upper end portion of the ridge located between two first grooves 122). In this manner, removal of optical transmission member 10 from first groove 122 can be prevented by pressing optical transmission member 10 toward first groove 122 with pressing member 123.

First groove 122 may be disposed parallel to the rear surface of ferrule 100, or may be disposed in a manner that it comes closer to the rear surface of ferrule 100 in the direction toward first surface 140. In the present embodiment, first groove 122 is disposed parallel to the rear surface of ferrule 100.

Pressing member 123 presses optical transmission member 10 toward first groove 122. In other words, pressing member 123 presses optical transmission member 10 toward a connector main body including holding recess 121, first surface 140 and second surface 160. Pressing member 123 is disposed to cover holding recess 121 where the end portion of optical transmission member 10 is disposed. The configuration of pressing member 123 is not limited as long as the above-described function can be achieved. In the present embodiment, pressing member 123 includes pressing member main body 125. Pressing member 123 is housed inside holding recess 121. Protrusion 126 of sliding part 124 is disposed at the side surface of pressing member main body 125.

Sliding part 124 is a mechanism for sliding pressing member 123 in the extending direction of optical transmission member 10. Sliding part 124 is not limited as long as the above-described function can be achieved. In the present embodiment, sliding part 124 includes protrusion 126 and sliding groove 127. In sliding part 124, protrusion 126 and sliding groove 127 are disposed at pressing member 123 and holding recess 121, respectively, or sliding groove 127 and protrusion 126 are disposed at pressing member 123 and holding recess 121, respectively. In the present embodiment, protrusion 126 is disposed at pressing member main body 125 and sliding groove 127 is disposed at holding recess 121.

Protrusion 126 is disposed at both ends in the first direction (the X direction) in pressing member main body 125. In the present embodiment, protrusion 126 is a ridge disposed along the extending direction of optical transmission member 10 in pressing member main body 125. In the present embodiment, the cross-section orthogonal to the extending direction of protrusion 126 has the same size from one end portion to the other end portion. Protrusion 126 is disposed at both end portions in the first direction (the X direction) in pressing member main body 125, and laterally protruded. Regarding the width (the length in the up-down direction in side view of ferrule 100) of protrusion 126, it is preferable that the width of the opening of sliding groove 127 be small. That is, preferably, protrusion 126 is configured to be press-fitted to sliding groove 127.

Sliding groove 127 is disposed at the surfaces on the both sides in the first direction (the X direction) in holding recess 121. Sliding groove 127 is disposed such that the width of its opening decreases toward first surface 140. In the present embodiment, sliding groove 127 includes first tapered part 127a, first straight part 127b, second tapered part 127c, and second straight part 127d. In sliding groove 127, first tapered part 127a, first straight part 127b, second tapered part 127c, and second straight part 127d are disposed in this order. Second straight part 127d has a smaller width of the opening than first straight part 127b. In this manner, preferably, sliding groove 127 has a portion where the width (the length in the up-down direction in side view of ferrule 100) of the opening is small.

First surface 140 is disposed to face the end surface of the plurality of optical transmission members 10 held by holding part 120. First surface 140 allows incidence of light emitted from the plurality of optical transmission members 10. Note that first surface 140 may emit, toward the end surface of the plurality of optical transmission members 10, the light entered from second surface 160. The shape of first surface 140 is not limited as long as the above-described function can be achieved. First surface 140 may include a plurality of projecting surfaces, or may be a plane. In the present embodiment, first surface 140 is a plane. First surface 140 is disposed at a part of the inner surface of holding recess 121.

The surface of first surface 140 that makes contact with the end surface of optical transmission member 10 may be tilted in a manner that it comes closer to second surface 160 in the direction toward the rear surface of ferrule 100, or may be perpendicular to the rear surface of ferrule 100. In the present embodiment, the surface of first surface 140 that makes contact with the end surface of optical transmission member 10 is tilted in a manner that it comes closer to second surface 160 in the direction toward the rear surface of ferrule 100. Preferably, the inclination angle of first surface 140 is the same as the inclination angle of the end surface of optical transmission member 10. The inclination angle of first surface 140 with respect to the second direction (the Z direction) set as 0 degree is within a range of 3 to 8 degrees, preferably 5 to 8 degrees, for example. In the present embodiment, the inclination angle of first surface 140 with respect to the second direction (the Z direction) set as 0 degree is 5 degrees.

Second surface 160 emits, to the outside, the light entered from first surface 140. Note that second surface 160 may allow incidence of light from the outside. The shape of second surface 160 is not limited as long as the above-described function can be achieved. Second surface 160 may include a plurality of projecting surfaces, or may be a plane. In the present embodiment, second surface 160 includes a plurality of projecting surfaces 161. Projecting surfaces 161, which are disposed in parallel in the first direction (the X direction), emit, toward other ferrule 100, the light entered from first surface 140, or allow incidence of light from the outside. Second surface 160 is disposed in the front surface of ferrule 100. The planar shape of projecting surface 161 is not limited. The planar shape of projecting surface 161 may be a circular shape or a rectangular shape. In the present embodiment, the planar shape of projecting surface 161 is a circular shape. In addition, the number of projecting surfaces 161 is the same as the number of optical transmission member 10. That is, in the present embodiment, sixteen projecting surfaces 161 are provided.

Now, a method of attaching optical transmission member 10 to ferrule 100 is described below. First, the end portions of the plurality of optical transmission members are respectively disposed on a plurality of first grooves 122 such that the end surfaces of the plurality of optical transmission members 10 hit first surface 140. In this state, pressing member 123 is disposed at ferrule main body with a guide of sliding part 124. With a guide of sliding part 124, pressing member 123 is inserted from the back side toward front surface side of ferrule 100. At this time, since the width of sliding groove 127 decreases from the back surface toward front surface of ferrule 100, pressing member 123 moves from the top surface toward bottom surface of ferrule 100 as pressing member 123 is inserted from the back surface toward front surface of ferrule 100. Therefore, pressing member 123 presses optical transmission member 10 against first groove 122 while pressing the end surface of optical transmission member 10 against first surface 140. Thus, optical transmission member 10 can be accurately positioned at ferrule 100.

Effects

As described above, with ferrule 100 of the present embodiment, sliding groove 127 is formed such that the width of its opening decreases toward first surface 140, and thus optical transmission member 10 can be positioned in a manner of being pushed to first groove 122 while the end surface of optical transmission member 10 is pressed to first surface 140 side with pressing member 123. Thus, the end of optical transmission member 10 can be accurately positioned, and the ease of assembling increases.

Modification 1

Next, an optical connector according to Modification 1 is described. The optical connector according to the present modification is different from optical connector 50 according to Embodiment 1 in the configuration of holding part 220 excluding pressing member 123 of ferrule 200. In view of this, the same components as those of the optical connector 50 according to Embodiment 1 are denoted with the same reference numerals, and the description thereof is omitted.

Figure 9A:
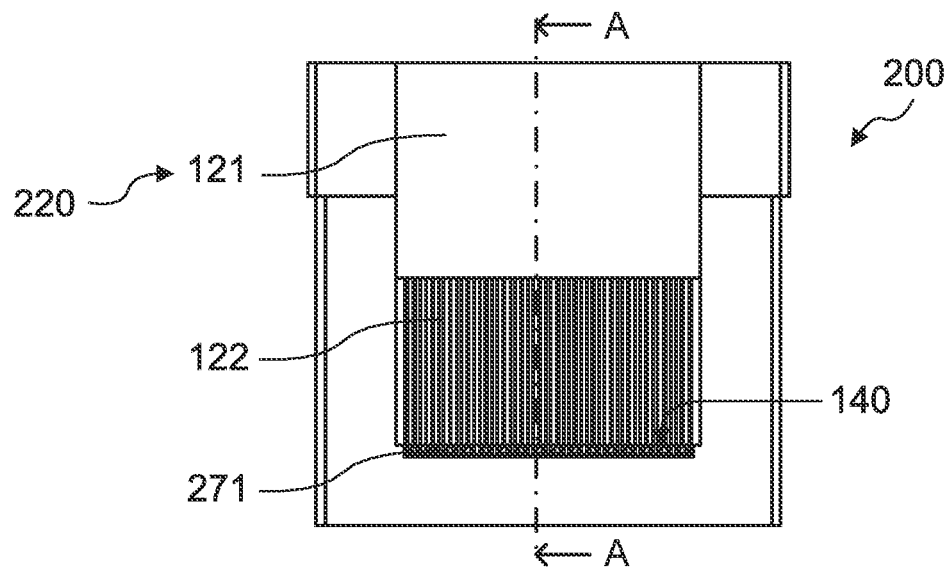
FIGS. 9A to 9C are diagrams illustrating a configuration of the ferrule from which a lid is detached in Modification 1.
Figure 9B:
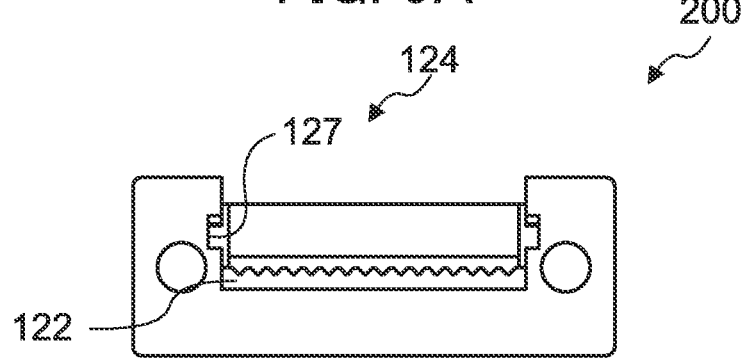
Figure 9C:
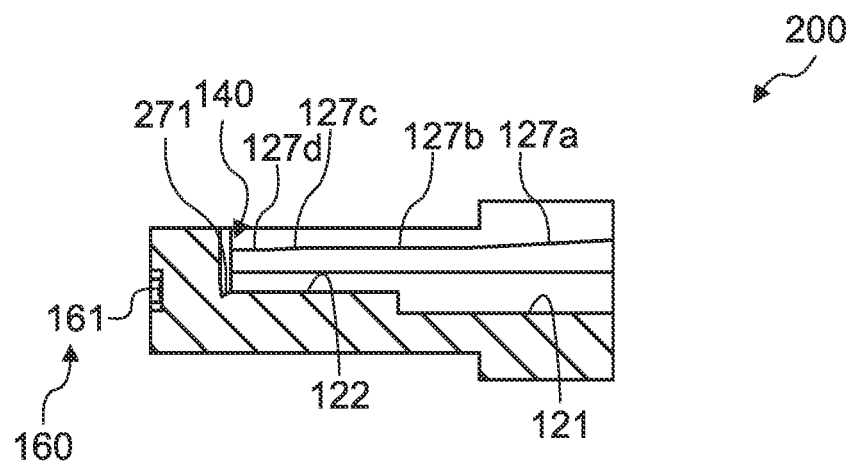

FIG. 9A is a plan view of ferrule 200 from which a lid is detached, FIG. 9B is a rear view, and FIG. 9C is a sectional view taken along line A-A of FIG. 9A.

The optical connector according to the present modification includes ferrule 200 and optical transmission member 10. As illustrated in FIGS. 9A to 9C, ferrule 200 includes holding part 220, first surface 140, and second surface 160. Holding part 220 includes holding recess 121, first groove 122, pressing member 123, sliding part 124, and third groove 271.

Third groove 271 serves as an escape area for the end of optical transmission member 10, as well as a reservoir for excess adhesive. Third groove 271 is disposed between first surface 140 and first groove 122. Third groove 271 is disposed along third direction (the Y direction).

Effects

In the above-described manner, the optical connector of the present modification has an effect similar to that of optical connector 50 according to Embodiment 1. In addition, since the optical connector according to the present modification includes third groove 271, optical transmission member 10 can be further accurately positioned.

Modification 2

Next, an optical connector according to Modification 2 is described. The optical connector according to the present modification is different from optical connector 50 according to Embodiment 1 in the configuration of holding part 320 excluding pressing member 123 of ferrule 300. In view of this, the same components as those of optical connector 50 according to Embodiment 1 are denoted with the same reference numerals, and the description thereof is omitted.

Figure 10A:
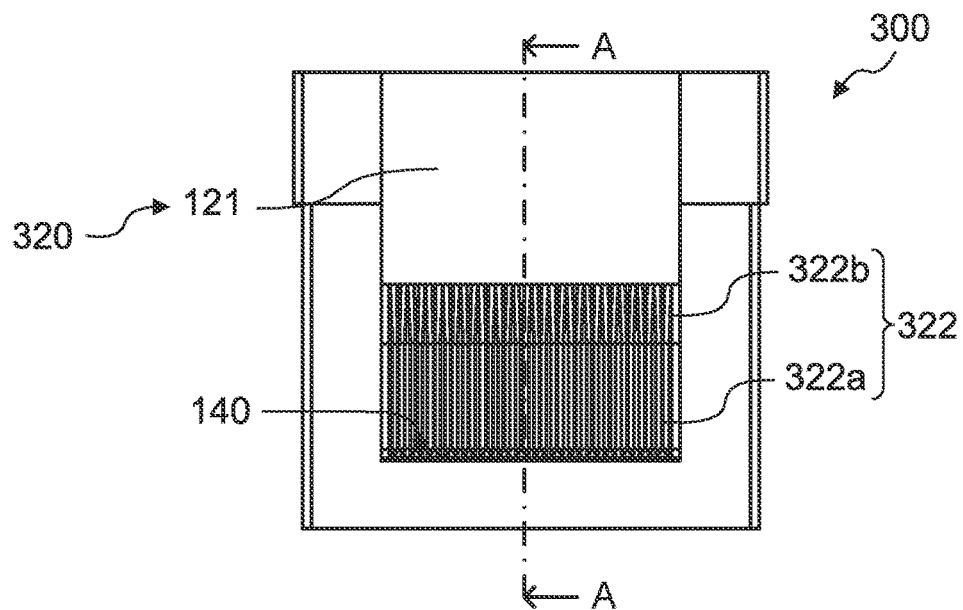
FIGS. 10A to 10C are diagrams illustrating a configuration of a ferrule from which a lid is detached in Modification 2.
Figure 10B:
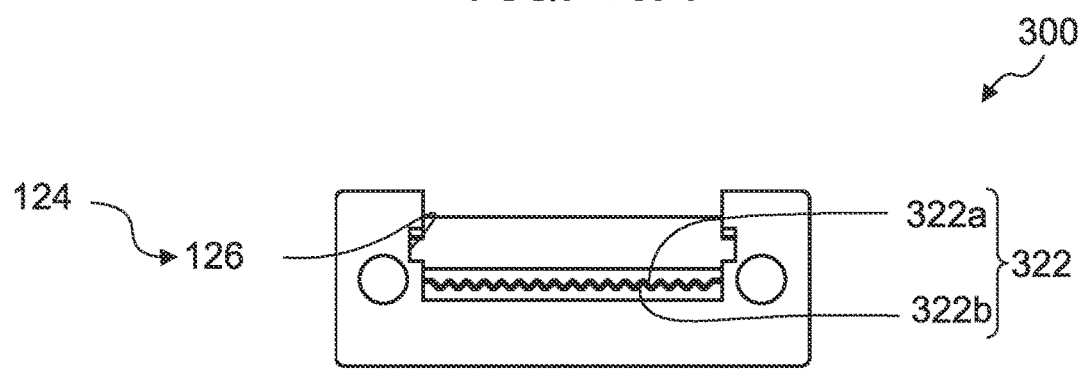
Figure 10C:
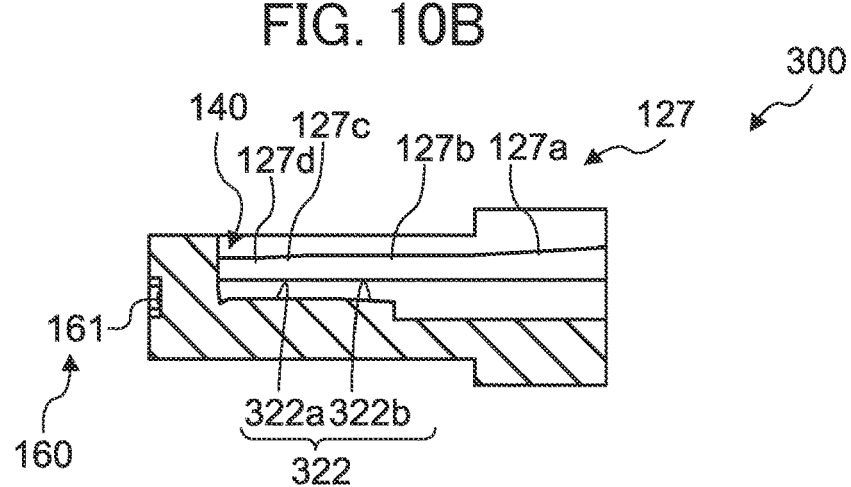

FIG. 10A is a plan view of ferrule 300 from which a lid is detached, FIG. 10B is a rear view, and FIG. 10C is a sectional view taken along line A-A of FIG. 10A.

The optical connector according to the present modification includes ferrule 300, and optical transmission member 10. As illustrated in FIGS. 10A to 10C, ferrule 300 includes holding part 320, first surface 140, and second surface 160. Holding part 320 includes holding recess 121, first groove 322, pressing member 123, and sliding part 124.

First groove 322 according to the present modification includes first straight groove 322a, and first tapered groove 322b. First straight groove 322a is the same as first groove 122 in Embodiment 1. First tapered groove 322b is connected to the base end portion of first straight groove 322a on the side opposite to first surface 140. First tapered groove 322b is disposed such that its width decreases toward first surface 140. In addition, first tapered groove 322b is disposed such that its depth decreases toward first surface 140. In this case, optical transmission member 10 is guided to first straight groove 322a through first tapered groove 322b, and thus each optical transmission member 10 can be easily appropriately guided to each first groove 322.

Effects

In the above-described manner, the optical connector of the present modification has an effect similar to that of optical connector 50 according to Embodiment 1. In addition, since first groove 322 of ferrule 300 of the optical connector according to the present modification includes first tapered groove 322b, each optical transmission member 10 can be easily appropriately guided to first groove 322.

Modification 3

Next, an optical connector according to Modification 3 is described. The optical connector according to the present modification is different from ferrule 100 of the optical connector according to Embodiment 1 in the configuration of lid 423. In view of this, the same components as those of optical connector 50 according to Embodiment 1 are denoted with the same reference numerals, and the description thereof is omitted.

FIG. 11A is a perspective view of lid 423 as viewed from the lower side, FIG. 11B is a plan view, FIG. 11C is a bottom view, FIG. 11D is a side view, and FIG. 11E is a rear view.

The optical connector according to the present modification includes a ferrule and optical transmission member 10. The ferrule includes a holding part, first surface 140, and second surface 160. The holding part includes holding recess 121, first groove 122, lid 423, and sliding part 124.

As illustrated in FIGS. 11A to 11E, lid 423 includes pressing member main body 125, and pressing part 473. Pressing part 473 is disposed in the region of substantially half of the rear surface of pressing member main body 125 on first surface 140 side. Pressing part 473 protrudes from the bottom surface of lid 423. Thus, with pressing part 473, optical transmission member 10 can be more reliably pushed toward the ferrule main body.

Effects

In the above-described manner, the optical connector of the present modification has an effect similar to that of optical connector 50 according to Embodiment 1. In addition, since the optical connector according to the present modification includes pressing part 473, optical transmission member 10 can be further accurately positioned.

Modification 4

Next, an optical connector according to Modification 4 is described. The optical connector according to the present modification is different from optical connector 50 according to Embodiment 1 in the configuration of lid 523 of the ferrule. In view of this, the same components as those of optical connector 50 according to Embodiment 1 are denoted with the same reference numerals, and the description thereof is omitted.

Figure 12A:
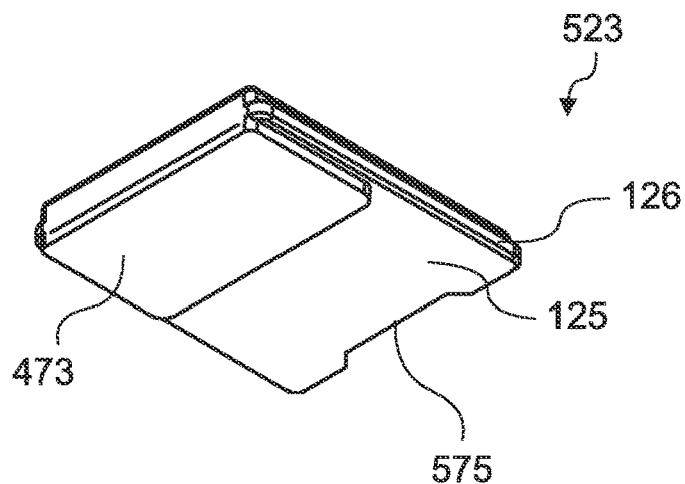
FIGS. 12A to 12E are diagrams illustrating a configuration of a lid according to Modification 4.
Figures 12B, 12C:
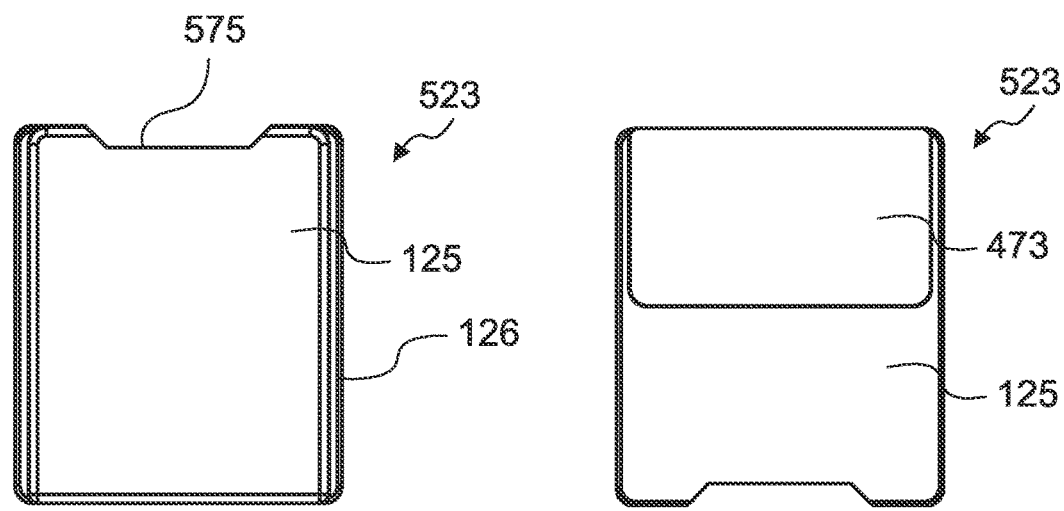
Figures 12D, 12E:
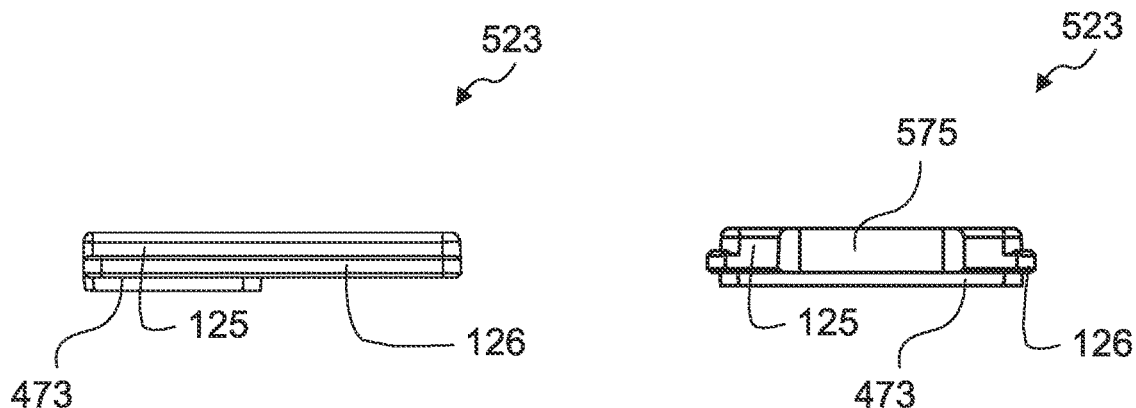

The optical connector according to the present modification includes the ferrule and optical transmission member 10. FIG. 12A is a perspective view of lid 523 as viewed from the lower side, FIG. 12B is a plan view, FIG. 12C is a bottom view, FIG. 12D is a side view, and FIG. 12E is a rear view.

The ferrule includes a holding part, first surface 140, and second surface 160. The holding part includes holding recess 121, first groove 122, lid 523, and sliding part 124.

As illustrated in FIGS. 12A to 12E, lid 523 includes pressing member main body 125, pressing part 473, and notch 575 formed in pressing member main body 125. Notch 575 is disposed at the side surface of pressing member main body 125 on the base end side. Lid 523 can be easily slid by pushing notch 575.

Effects

In the above-described manner, the optical connector of the present modification has an effect similar to that of optical connector 50 according to Embodiment 1. In addition, since the optical connector according to the present modification includes notch 575, optical transmission member 10 can be easily slid.

Modification 5

Next, an optical connector according to Modification 5 is described. The optical connector according to the present modification is different from optical connector 50 according to Embodiment 1 in the configuration of lid 623 of the ferrule. In view of this, the same components as those of optical connector 50 according to Embodiment 1 are denoted with the same reference numerals, and the description thereof is omitted.

Figure 13A:
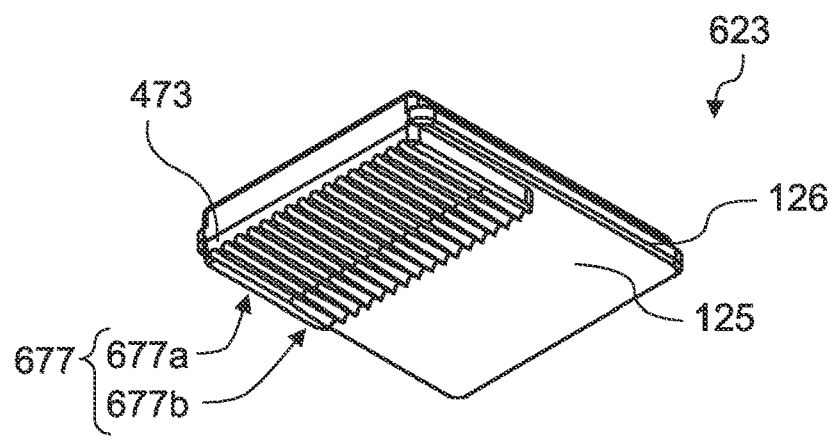
FIGS. 13A to 13E are diagrams illustrating a configuration of a lid according to Modification 5.
Figure 13B:
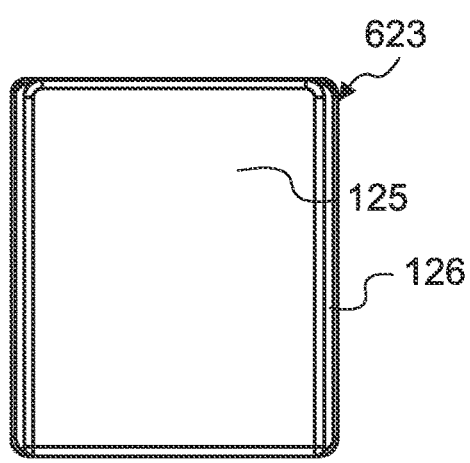
Figure 13C:
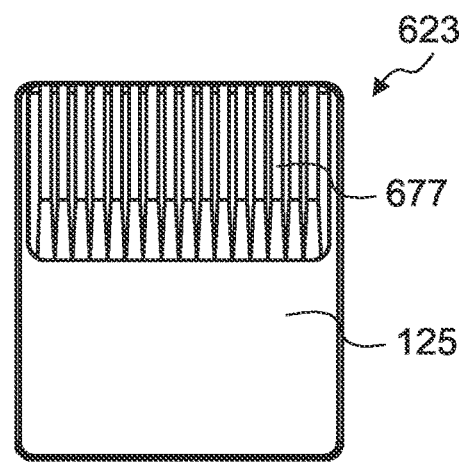
Figure 13D:
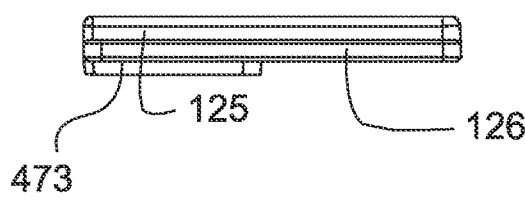
Figure 13E:
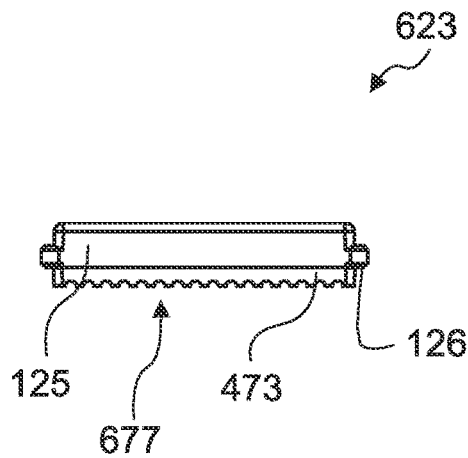

FIG. 13A is a perspective view of lid 623 as viewed from the lower side, FIG. 13B is a plan view, FIG. 13C is a bottom view, FIG. 13D is a side view, and FIG. 13E is a rear view.

The optical connector according to the present modification includes a ferrule, and optical transmission member 10. The ferrule includes a holding part, first surface 140, and second surface 160. The holding part includes holding recess 121, first groove 122, lid 623, and sliding part 124.

As illustrated in FIGS. 13A to 13E, lid 623 includes pressing member main body 125, pressing part 473, and second groove 677. Pressing part 473 is disposed in the region of substantially half of the rear surface of pressing member main body 125 on the first surface 140 side. Second groove 677 is formed in the rear surface of pressing part 473. Second groove 677 is disposed at a position facing first groove 122 along the extending direction of optical transmission member 10. Second groove 677 includes second straight groove 677a, and second tapered groove 677b. Second straight groove 677a has the same configuration as first straight groove 322a except that it is formed in pressing part 473. In addition, second tapered groove 677b is the same as first tapered groove 322b except that it is formed in pressing part 473.

Effects

In the above-described manner, the optical connector of the present modification has an effect similar to that of optical connector 50 according to Embodiment 1. In addition, since the optical connector according to the present modification includes second groove 677, lid 623 can be easily slid.

Note that the ferrule according to Modification 1 from which the lid is detached may be combined with lid 423 according to Modification 3, the ferrule according to Modification 1 from which the lid is detached may be combined with lid 523 according to Modification 4, and the ferrule according to Modification 1 from which the lid is detached may be combined with lid 623 according to Modification 5. In addition, the ferrule according to Modification 2 from which the lid is detached may be combined with lid 423 according to Modification 3, the ferrule according to Modification 2 from which the lid is detached may be combined with lid 523 according to Modification 4, and the ferrule according to Modification 2 from which the lid is detached may be combined with lid 623 according to Modification 5.

Industrial Applicability

The optical connector according to the present invention is suitable for optical communications using optical transmission members.

REFERENCE SIGNS LIST

10 Optical transmission member
50 Optical connector
100, 200, 300 Ferrule
120, 220, 320 Holding part
121 Holding recess
122, 322 First groove
123, 423, 523, 623 Pressing member
124 Sliding part
125 Pressing member main body
126 Protrusion
127 Sliding groove
127a First tapered part
127b First straight part
127c Second tapered part
127d Second straight part
140 First surface
160 Second surface
161 Projecting surface
271 Third groove
322a First straight groove
322b First tapered groove
473 Pressing part
575 Notch
677 Second groove
677a Second straight groove
677b Second tapered groove

The invention claimed is:

1. A ferrule configured to hold an optical transmission member, the ferrule comprising:
a holding part configured to hold one end portion of the optical transmission member;
a first surface configured to allow light emitted from the optical transmission member held by the holding part to enter the ferrule; and
a second surface configured to emit, to outside of the ferrule, light advanced inside of the ferrule,
wherein the holding part including:
a holding recess,
a first groove disposed at the holding recess along an extending direction of the optical transmission member, the first groove being a groove where the optical transmission member is disposed,
a pressing member configured to press the optical transmission member toward the first groove, and
a sliding part disposed at the holding recess and the pressing member, and configured to slide the pressing member with respect to the holding recess along the extending direction of the optical transmission member.

2. The ferrule according to claim 1, wherein the sliding part includes a combination of a sliding groove disposed at the holding recess along the extending direction of the optical transmission member and a protrusion disposed at the pressing member, or a combination of a sliding groove disposed at the pressing member along the extending direction of the optical transmission member and a protrusion disposed at the holding recess.

3. The ferrule according to claim 2,
wherein the sliding groove includes a portion where a width of an opening is reduced; and
wherein a width of the protrusion has a width equal to or greater than the width of the portion of the sliding groove where the width of the opening is reduced.

4. The ferrule according to claim 2, wherein the protrusion is configured to be press-fitted to the sliding groove.

5. The ferrule according to claim 1, wherein the pressing member further includes a pressing part disposed at a position facing the first groove and configured to press the optical transmission member toward the first groove.

6. The ferrule according to claim 1, wherein the pressing member further includes a second groove disposed at a position facing the first groove along the extending direction of the optical transmission member.

7. The ferrule according to claim 1, further comprising a third groove disposed between the first surface and the first groove and having a depth greater than that of the first groove.

8. The ferrule according to claim 1, wherein the first groove is a V-groove.

9. An optical connector comprising:
the ferrule according to claim 1, and
an optical transmission member.

10. An optical connector module comprising the optical connector according to claim 9.

* * * * *